United States Patent
Sajassi et al.

(10) Patent No.: US 8,004,968 B2
(45) Date of Patent: Aug. 23, 2011

(54) PROVIDER EDGE-CONTROLLED REDUNDANCY USING PSEUDO LINK AGGREGATION CONTROL PROTOCOL

(75) Inventors: Ali Sajassi, San Ramon, CA (US); Samer Salam, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 100 days.

(21) Appl. No.: 12/344,099

(22) Filed: Dec. 24, 2008

(65) Prior Publication Data
US 2010/0157793 A1 Jun. 24, 2010

(51) Int. Cl.
*H04J 3/16* (2006.01)
(52) U.S. Cl. ........ 370/228; 370/464; 370/465; 370/466; 370/467
(58) Field of Classification Search .................. 370/357, 370/360, 366, 465–469; 709/217–244
See application file for complete search history.

(56) References Cited

U.S. PATENT DOCUMENTS

| | | | |
|---|---|---|---|
| 2005/0025157 A1* | 2/2005 | Pennec et al. ............... | 370/395.5 |
| 2007/0121617 A1* | 5/2007 | Kanekar et al. ............... | 370/389 |
| 2008/0101387 A1* | 5/2008 | Wackerly ..................... | 370/401 |
| 2008/0159311 A1* | 7/2008 | Martinotti et al. ............. | 370/401 |
| 2008/0225695 A1* | 9/2008 | Balus et al. ................... | 370/216 |
| 2009/0073989 A1* | 3/2009 | Cai et al. ................... | 370/395.53 |

OTHER PUBLICATIONS

IEEE Std 802.3ad Section Three; "43. Link Aggregation"; 2005; pp. 285-349; IEEE; USA.

* cited by examiner

*Primary Examiner* — Hassan Kizou
*Assistant Examiner* — Charles C Jiang
(74) *Attorney, Agent, or Firm* — Patent Capital Group

(57) ABSTRACT

In one embodiment, a system comprises a plurality of provider edge (PE) devices, the PE devices having a plurality of ports; and a pseudo-link aggregation control protocol (LACP) module instantiated for each of the ports. The pseudo-LACP module allows the PE devices to support dual-homing of an access side, the access side including either an access node or an access network, without running any control protocol for redundancy on the access side.

19 Claims, 3 Drawing Sheets

PROVIDER EDGE-CONTROLLED REDUNDANCY USING PSEUDO LINK AGGREGATION CONTROL PROTOCOL

TECHNICAL FIELD

The present disclosure relates generally to improving reliability in network communications by providing link and node redundancy.

BACKGROUND OF THE INVENTION

In carrier Ethernet networks, it is required to provide link and node redundancy for certain network topologies including, for example: 1) a dual-homed access node linked to two provider edge (PE) devices—such as a customer edge (CE) or a digital subscriber line access multiplexer (DSLAM) linked to two PE devices—and 2) an access network linked to two provider edge (PE) devices. The two PE devices typically may feed into an aggregation or core network.

There are a number of existing mechanisms available to achieve redundancy for the above topologies. These require, however, the access (e.g., typically a customer of the provider) node or nodes to be running some type of specialized protocol. For example, a customer device (e.g., CE or DSLAM on the access side) typically configures one of its uplink ports as primary while the other is configured as backup so that failure of the primary causes a switchover to the backup link. In this scheme, the provider PE devices do not run any protocol. Consequently, the PE nodes have no control over the link selection or switchover.

DESCRIPTION OF EXAMPLE EMBODIMENTS

Figure 1:
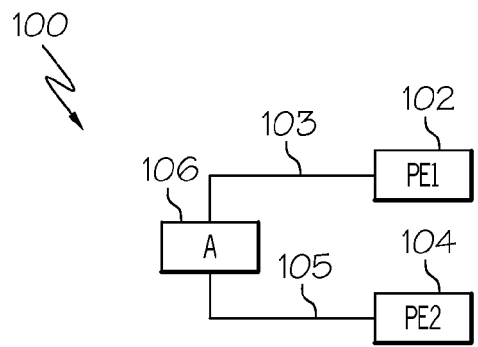
FIG. 1 is a communications network diagram illustrating an example of a network topology to which disclosed embodiments may be applied.

The following detailed description includes the best currently contemplated modes of carrying out the invention. The description is not to be taken in a limiting sense, but is made merely for the purpose of illustrating the general principles of the invention, since the scope of the invention is best defined by the appended claims. Various inventive features are described below that can each be used independently of one another or in combination with other features.

Overview

In one embodiment, a provider edge (PE) device comprises at least one port; and a pseudo-link aggregation control protocol (pseudo-LACP) module instantiated for the at least one the port, wherein the pseudo-LACP module enables dual-homing of an access side of a communication network without running any redundancy protocol between the PE device and the access side.

In another embodiment a method of redundancy on an access side of a communication network comprises faking reception of link aggregation control protocol (LACP) protocol data units (PDU) by a provider edge (PE) device; and using the faked reception of LACP PDUs to enable LACP on the PE device without running LACP on the access side.

In a further embodiment an apparatus comprises means for faking reception of link aggregation control protocol (LACP) protocol data units (PDU) and filtering LACP PDUs so that actual LACP PDUs are prevented from being sent; means for responding to one of a link failure and a node failure by stopping the fake reception; and means for triggering a failover of network traffic upon stopping of the fake reception.

DESCRIPTION

Link and node redundancy for reliability in network communications are disclosed in which modifications only need to be made on one side of a network, i.e., by a service provider only to the service provider's hardware or software on the provider side, without affecting devices of the service provider's customers on the access side of the network. Embodiments may allow the service provider to make use of single-chassis link redundancy, as well as multi-chassis redundancy, with all the control performed on the provider edge (PE) side. Also disclosed are link and node redundancy in which the access node or network (on, e.g., the customer side) does not require running any resiliency protocol with the PE—for example, no spanning tree protocol (STP) or link aggregation control protocol (LACP). In addition, embodiments may simplify the operation of two-way pseudo-wire (PW) redundancy because the pseudo-LACP modules that are disclosed can synchronize state and drive the status (active/standby) of the PW. Thus, in accordance with some embodiments, it may be sufficient to use only a single PW status bit, and no handshake mechanism need be required (e.g., no need for a Request Active bit). Redundancy for carrier Ethernet networks can be a critical issue for service providers wishing to build large-scale resilient networks, and embodiments may be advantageously used in the carrier Ethernet marketplace to implement network level redundancy.

In contrast to redundancy schemes that typically require redundancy protocol to run between the access node or access network and the PE nodes (i.e., protocol running on both the access side and provider side), embodiments may run redundancy protocol only on the PE nodes (i.e., provider side only and not on the access side). Unlike redundancy schemes that work for only one network topology, embodiments may work for multiple network topologies, e.g., supporting dual-homing of a single access node or an entire access network. In addition, embodiments may locate control of the primary and backup link designation and failover in the PE nodes. This feature may be desirable for service providers because they would have control instead of leaving the redundancy mechanism in the hands of their customers (for example, an end-customer in the case of CE dual-homing, or another service provider in the case of whole-sale services). Embodiments may also maximize code-reuse and minimize time to market in comparison to previously known redundancy schemes because the IEEE 802.3ad LACP/LAG (link aggregation group) implementation on the PE nodes can be reused as is.

Figure 2:
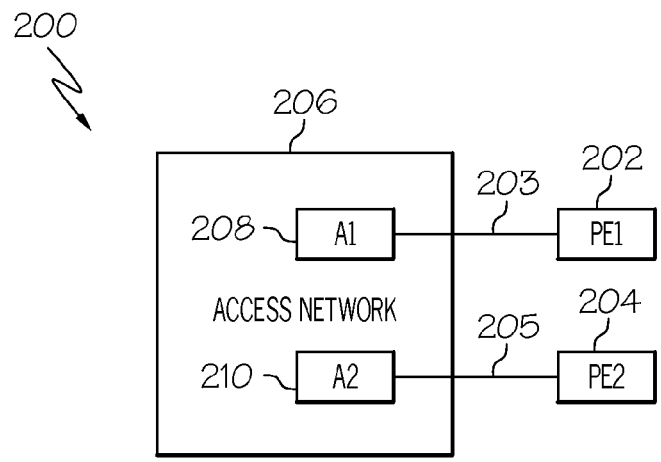
FIG. 2 is a communications network diagram illustrating another example of a network topology to which disclosed embodiments may be applied.

FIGS. 1 and 2 illustrate simplified communication network systems 100 and 200 exemplifying, respectively, a first network topology and a second network topology to provide examples of the way in which embodiments may be applied in communications networks. Referring to FIG. 1, network system 100 may include provider edge (PE) devices 102 and 104 (also referred to as "nodes"). The PE devices 102, 104 may be linked via links 103, 105 to an access node 106 to form the first topology. Access node 106 may comprise a device such as a customer edge (CE) device or digital subscriber line access multiplexer (DSLAM). Referring to FIG. 2, network system 200 may include provider edge (PE) devices 202 and 204 (also referred to as "nodes"). The PE devices 202, 204 may be linked via links 203, 205 to an access network 206 to form the second topology. Access network 206 may comprise access nodes 208, 210, each of which may include a device such as a switch/bridge or DSLAM. Embodiments may provide redundancy for the network topologies of systems 100 and 200 while operating only on the PE devices 102, 104, 202, and 204.

Figure 3:
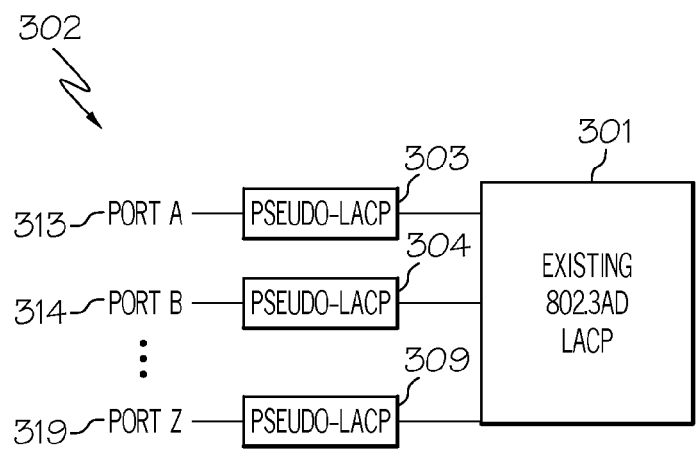
FIG. 3 is a functional block diagram for link aggregation control protocol on a single provider edge (PE) device, in accordance with one embodiment.

FIG. 3 illustrates link aggregation control protocol (LACP) on a single provider edge (PE) device, in accordance with one embodiment. The PE devices—such as PE devices 102, 104, 202, and 204—may implement Ethernet link aggregation in an LACP module 301 in accordance with IEEE 802.3ad LACP. A "pseudo-LACP" module 302 may be defined and instantiated (e.g., instantiations 303, 304, 309) per physical port (e.g., ports 313, 314, 319) that is connected to an access node (not shown in FIG. 3). For example, there may be an instantiation of a pseudo-LACP module for each physical port (e.g., ports 313, 314, 319) that will run pseudo-LACP. The pseudo-LACP module 302 can be instantiated when pseudo-LACP operation is configured for the port in question (e.g., via command-line interface or via some other programmatic interface—such as Simple Network Management Protocol (SNMP) Management Information Base (MIB)). The pseudo-LACP module 302 may be responsible for "faking" (see, e.g., FIG. 4) that it is receiving LACP protocol data units (PDU)s from a particular peer (e.g., an access node to which the PE device is linked) with configurable LACP parameters (e.g., System ID, System Priority, Port ID, Port Priority, Port Key). The pseudo-LACP module 302 then conveys that information to the existing LACP implementation, e.g., LACP module 301. Note that the LACP implementation, e.g., LACP module 301, may not require any changes. Any attempts to generate LACP PDUs by the LACP module 301 may be intercepted and filtered by the pseudo-LACP module 302 (e.g., by the affected instantiation 303-309), so that no LACP PDUs are actually transmitted over any port (e.g. ports 313-319).

Figure 4:
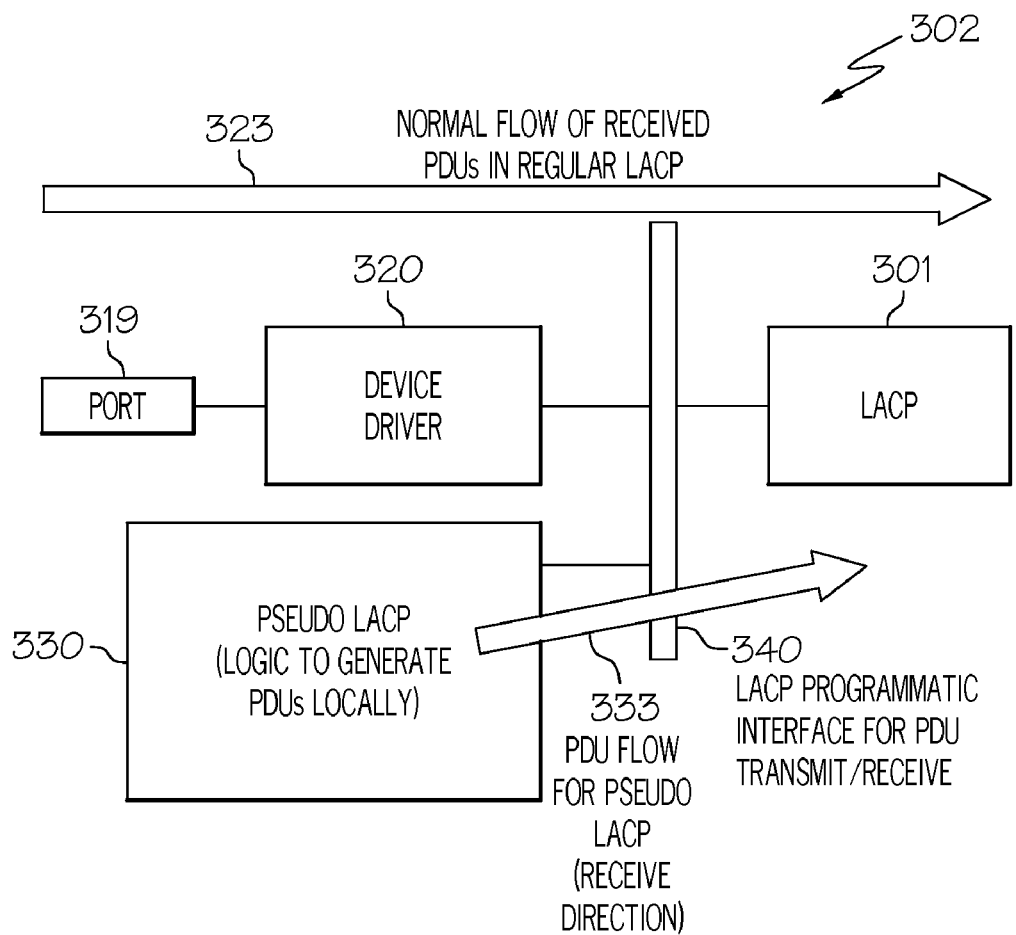
FIG. 4 is a system block diagram illustrating an example of an implementation for a pseudo-LACP module in accordance with one embodiment.

FIG. 4 illustrates an example of an implementation for pseudo-LACP module 302. In normal LACP operation, the LACP module 301 would expect LACP PDUs in the defined standard format to arrive over a port—e.g., port 319—and be handed off from the device driver associated with the port in question, i.e., device driver 320 associated with port 319. PDU flow for this normal operation is indicated by arrow 323 in FIG. 4. In the example embodiment, LACP is not actually running over the wire (e.g., link 103, 105, 203, or 205), so normal PDUs (indicated by arrow 323) will not arrive on the port, e.g., port 319.

The pseudo-LACP module 302 may, in the example embodiment, internally generate (e.g., using logic 330) LACP PDUs (i.e., the "fake" PDUs) with pre-determined LACP parameters. The pre-determined LACP parameters (e.g., System ID, System Priority, Port ID, Port Priority, Port Key) can, for example, be either user-configurable or hard-coded. The pseudo-LACP module 302 may invoke the LACP module 301 through the same programmatic interface 340 which the device driver (e.g., driver 320) typically uses to hand over a received PDU. PDU flow for this pseudo-LACP operation is indicated by arrow 333 in FIG. 4. Thus, the pseudo-LACP module 302 may be described as effectively faking the reception of the normal PDUs from the wire. The PDUs in this embodiment may be generated by the pseudo-LACP module 302 internal to the PE (e.g., PE 102, 104, 202, or 204) as opposed to being generated by a remote CE and transmitted over the link (e.g., link 103, 105, 203, or 205) to the PE.

Thus, the PE devices—such as PE devices 102, 104, 202, and 204—may run IEEE 802.3ad LACP based Link Aggregation Group (LAG) with the access node (e.g., access node 106 in topology 100) or network (e.g., access network 206 in topology 200), without the access node or network supporting or running LACP. Embodiments can be used with standard IEEE 802.3ad LAG with LACP or multi-chassis LAG with LACP. In the former case, an embodiment may allow redundant links to be established between a single access node and a single PE (link redundancy). In the latter case, an embodiment may allow dual-homing of a single access node to two PEs (e.g., topology 100) or dual-homing of an access network to two PEs (e.g., topology 200). All these variants can be supported with a single implementation, and without having to run any redundancy protocol between the access node or access network and the PE devices. In other words, all the logic may be implemented on the PE (provider) side without running any redundancy protocol on the access side.

Figure 5:
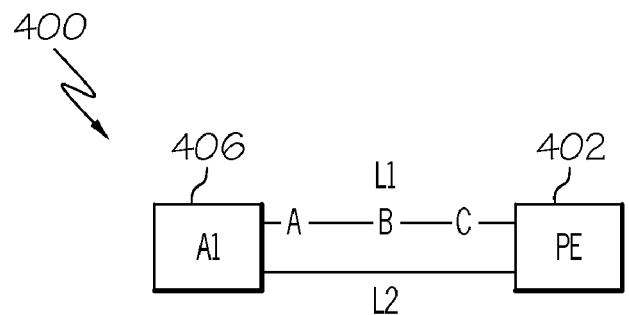
FIG. 5 is a communications network diagram illustrating a process for providing provider edge-controlled redundancy in accordance with one embodiment.

FIG. 5 shows communications network system 400 for the purpose of explaining the operation of the pseudo-LACP module 302 with an example. Network 400 may include a PE device 402, an access node 406, and links L1 and L2. Network 400 may be subject to the following types of example failures as indicated by A, B, and C on link L1 in FIG. 5: A) failure of access node user-network interface (UNI) port, B) failure of access node uplink, or C) failure of PE UNI port. Operation of a pseudo-LACP module 302 on PE device 402 may protect against failure points A, B, or C.

The PE 402 may be configured for pseudo-LACP operation, whereby on the link L1, virtual local area networks (VLAN)s 1-10 (not shown) may be active, and on the link L2 VLANs 11-20 may be active. These links L1, L2 may provide active/active redundancy for each other. In addition, the PE 402 may be configured so that the links in the link aggregation group (e.g., L1, L2 in this example) are configured in either active/active mode or active/standby mode. Thus, PE 402 may be configured for operation under IEEE 802.3ad LACP/LAG, and the pseudo-LACP module 302 may take the LACP configuration as a trigger to fake the reception (e.g., by generating fake PDUs) of LACP PDUs from A1 (access node 406). From the standpoint of the PE 402, both links L1 and L2 are in a link aggregation group (LAG); whereas from the standpoint of A1, L1 and L2 are two independent links, i.e., not in a LAG (hence the term pseudo-LACP).

The pseudo-LACP module 302 may not need to monitor the state of the access node 406 (A1) per se, it may only need to monitor the health of the links to A1. A1 may be configured such that all the VLANs (VLANS 1-20) are active on both uplinks. Traffic outbound from A1 can initially be flooded over both uplinks until A1 learns (through normal bridge learning function) which uplink to use for each VLAN.

Upon failure of type A, B, or C, the pseudo-LACP module 302 on PE 402 may detect the line-protocol state of the interface connecting to L1 going down, and stop generating fake PDUs. The LACP module (e.g. module 301) may be informed of the link-status change so it may remove L1 from the LAG, and traffic for VLANs 1-20 destined to A1 may all flow through L2 (in other words, VLANs 1-10 failover to L2 from the PE perspective). A1 may detect the link L1 going down, and flush its MAC table entries for VLANs 1-10. A1 may revert to flooding the traffic for those VLANs in this case, until the addresses are learned on the redundant link (L2). This process can be further optimized by having the pseudo-LACP module 302 trigger the generation of multiple VLAN registration protocol (MVRP) to A1, in order to eliminate the flooding phase.

Figure 6:
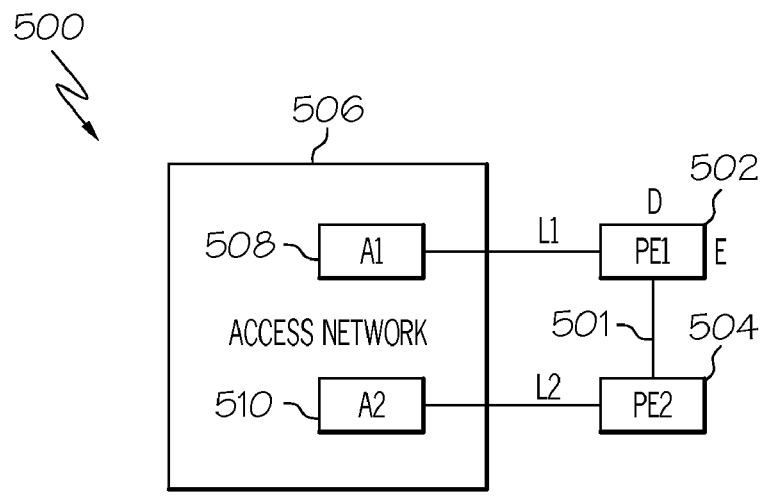
FIG. 6 is a communications network diagram illustrating a multi-chassis process for providing provider edge-controlled redundancy in accordance with one embodiment.

FIG. 6 shows communications network system 500 for the purpose of explaining with an example the operation of the pseudo-LACP module 302, where pseudo-LACP provides inter-chassis redundancy for a dual-homed network. Network 500 may include PE devices 502 and 504. The PE devices 502, 504 may be linked by L1 and L2 to an access network 506, which may comprise access nodes 508, 510, each of which may include a device such as a switch/bridge or DSLAM. The PE devices 502, 504 also may be linked by an inter-chassis communication channel (ICC) 501, which be implemented as a dedicated channel or via a network path, as known in the art.

The operation of pseudo-LACP on network 500 for providing protection for failures A, B and C is similar to network 400. The operation of pseudo-LACP on network 500, however, also provides protection for two additional types of example failures as indicated by D and E on PE1 (PE device 502) in FIG. 6: D) failure of PE node and E) isolation of PE node from upstream network.

In case of failure D, PE2 (PE device 504) may detect that PE1 is down via the loss of the heartbeat in the ICC 501. The pseudo-LACP module 302 may then trigger a failover.

In case of failure E, the pseudo-LACP module 302 on PE1 may reflect the uplink status into the downlink, for example, by bringing down link L1. This action may reduce failure E to one of the failure scenarios A, B, C. An indication may be sent by PE1 over ICC 501 to PE2 so that the pseudo-LACP module 302 triggers the failover of the affected VLANs. As above, the process can be further optimized by the pseudo-LACP module 302 triggering MVRP to avoid flooding in the access network 506.

Figure 7:
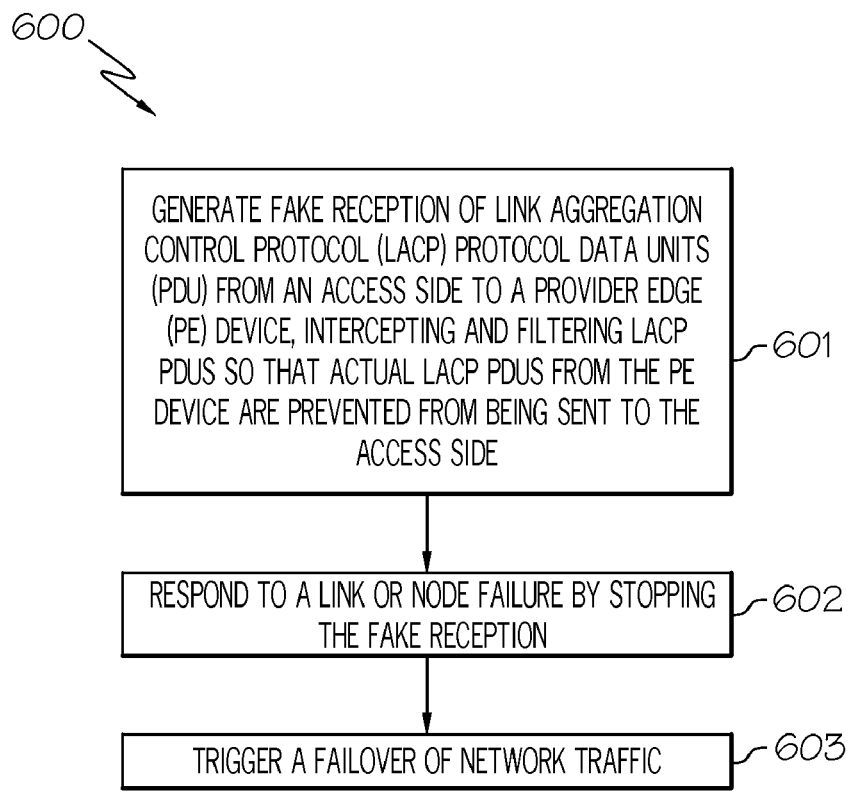
FIG. 7 is a flowchart illustrating a method for providing provider edge-controlled redundancy in accordance with one embodiment.

FIG. 7 illustrates a method 600 for providing provider edge-controlled redundancy in accordance with one embodiment. The method may be implemented in software or in hardware such as in an application specific integrated circuit (ASIC) or embedded logic. In a step 601, method 600 may generate fake reception of link aggregation control protocol (LACP) protocol data units (PDU) from an access side (e.g., an access node 406 or an access network 506) to a provider edge (PE) device (e.g., PE 402). In addition, method 600 may intercept and filter LACP PDUs from the LACP module on the PE device such that actual LACP PDUs from the PE device are prevented from being sent to the access side.

In a step 602, method 600 may respond to a link or node failure (e.g., a failure of type A, B, C, D, or E) by stopping the fake reception.

In a step 603, method 600 may trigger a failover of network traffic, for example, as described above with reference to FIGS. 5 and 6.

It should be understood, of course, that the foregoing relates to exemplary embodiments of the invention and that modifications may be made without departing from the spirit and scope of the invention as set forth in the following claims.

We claim:

1. A provider edge (PE) device, comprising:
at least one port;
a pseudo-link aggregation control protocol (pseudo-LACP) module instantiated for the at least one the port, wherein the pseudo-LACP module enables dual-homing of an access side of a communication network without running any redundancy protocol between the PE device and the access side, and wherein the dual-homing enablement includes the PE device providing link redundancy for the access side of the communication network; and
an LACP module that interfaces with the pseudo-LACP module, which generates fake LACP protocol data units.

2. The device of claim 1, further comprising:
a logic module that intercepts and filters link aggregation control protocol (LACP) protocol data units (PDUs) so that actual LACP PDUs from the PE device are prevented from being sent to the access side.

3. The device of claim 1, wherein the dual-homing enablement includes the PE device providing node redundancy for the access side.

4. The device of claim 1, wherein:
the dual-homing enablement includes the PE device providing protection against any combination chosen from the group consisting of:
failure of an access node user-to-network interface (UNI) port;
failure of an access node uplink;
failure of a PE UNI port;
failure of a PE node; and
isolation of the PE device from upstream network.

5. A method of redundancy on an access side of a communication network, comprising:
faking reception of link aggregation control protocol (LACP) protocol data units (PDU) by a provider edge (PE) device;
using the faked reception of LACP PDUs to enable LACP on the PE device without running LACP on the access side, responding to one of a link failure and a node failure by stopping the fake reception; and triggering a failover of network traffic upon stopping of the fake reception.

6. The method of claim 5, wherein the faking comprises internally generating, in the PE device, LACP PDUs with pre-determined LACP parameters.

7. The method of claim 5, wherein using the faked reception comprises:
monitoring, at the PE device, the health of a link to the access side; and
in response to a failure of the link, stopping reception of fake LACP PDUs so that LACP triggers failover to another link to the access side.

8. The method of claim 5, further comprising:
intercepting and filtering LACP PDUs so that actual LACP PDUs from the PE device are prevented from being sent to the access side.

9. The method of claim 5, further comprising:
omitting from the access side control protocol to provide redundancy with the PE device.

10. The method of claim 5, wherein:
the access side uses at least two links configured in a link aggregation group; and in response to a failure of one of the at least two links, the PE device stops faking reception of LACP PDUs.

11. The method of claim 10, wherein the failure of the link includes failure of an access node user-to-network interface (UNI) port, an access node uplink, or a PE UNI port.

12. The method of claim 10, wherein:
when the PE device stops faking reception of LACP PDUs, a failed link is removed from a link aggregation group and redirects traffic to another of the at least two links.

13. The method of claim 10, wherein:
the links in the link aggregation group are configured in active/active mode.

14. The method of claim 10, wherein:
the links in the link aggregation group are configured in active/standby mode.

15. The method of claim 10, further comprising:
generating multiple VLAN (virtual local area network) registration protocol (MVRP) to the access side.

16. The method of claim 5, wherein:
a second PE device is configured for pseudo-LACP operation, wherein:
the second PE device is linked to the access side, and
an inter-chassis communication channel (ICC) operates between the PE device and the second PE device; and
in response to a failure of the PE device, the second PE device will detect via the ICC that the PE device is down and a pseudo-LACP module on the second PE device will then trigger a failover.

17. The method of claim 5, wherein:
a second PE device is configured for pseudo-LACP operation, wherein:
the second PE device is linked to the access side, and
an inter-chassis communication channel (ICC) operates between the PE device and the second PE device; and
in response to an isolation of the PE device from an upstream network, a first pseudo-LACP module on the PE device reflects the uplink status into the downlink and an indication is sent by the PE device over the ICC to the second PE device so that a second pseudo-LACP module on the second PE device triggers a failover.

18. An apparatus comprising:
means for faking reception of link aggregation control protocol (LACP) protocol data units (PDU) and filtering LACP PDUs so that actual LACP PDUs are prevented from being sent;
means for responding to one of a link failure and a node failure by stopping the fake reception; and
means for triggering a failover of network traffic upon stopping of the fake reception.

19. The apparatus of claim 18, wherein:
the means for responding to a link or node failure includes means for responding to failure of an access node user-to-network interface (UNI) port, failure of an access node uplink, failure of a PE UNI port, failure of a PE node, or isolation of a PE node from an upstream network.

* * * * *